Aug. 15, 1950        C. DALBECK        2,519,119
PORTABLE POWER HOIST
Filed Feb. 18, 1949        2 Sheets-Sheet 1
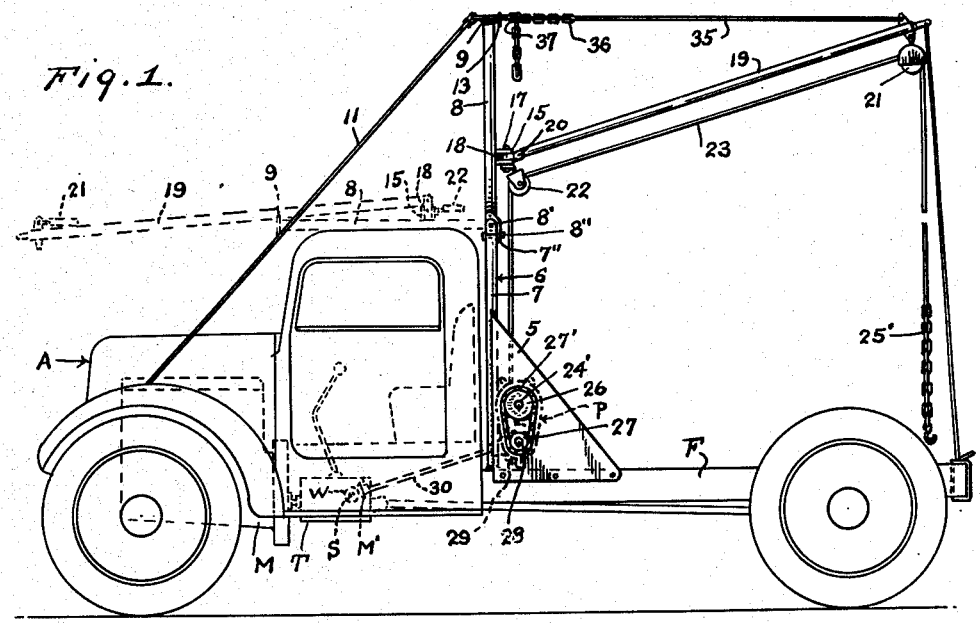
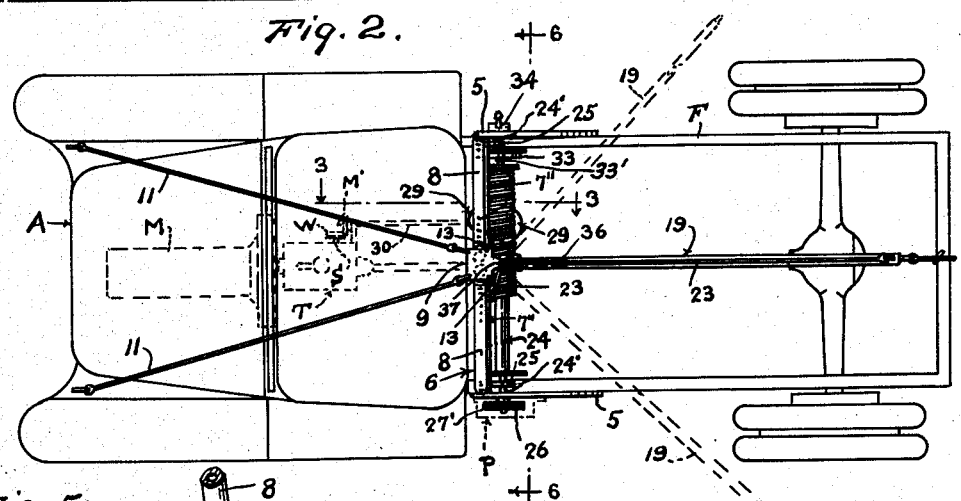
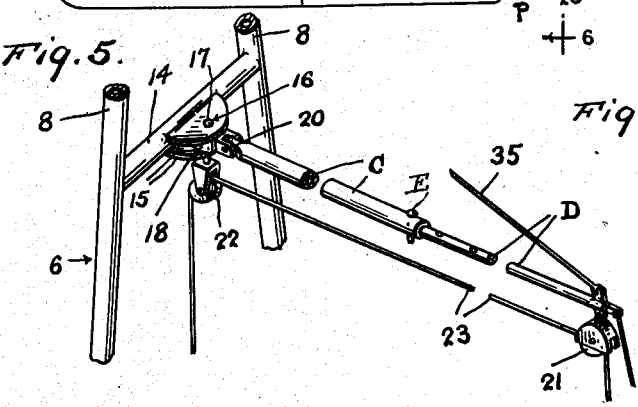
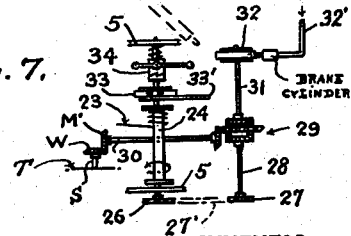
INVENTOR.
Clarence Dalbeck
BY
L. B. James
Attorney.

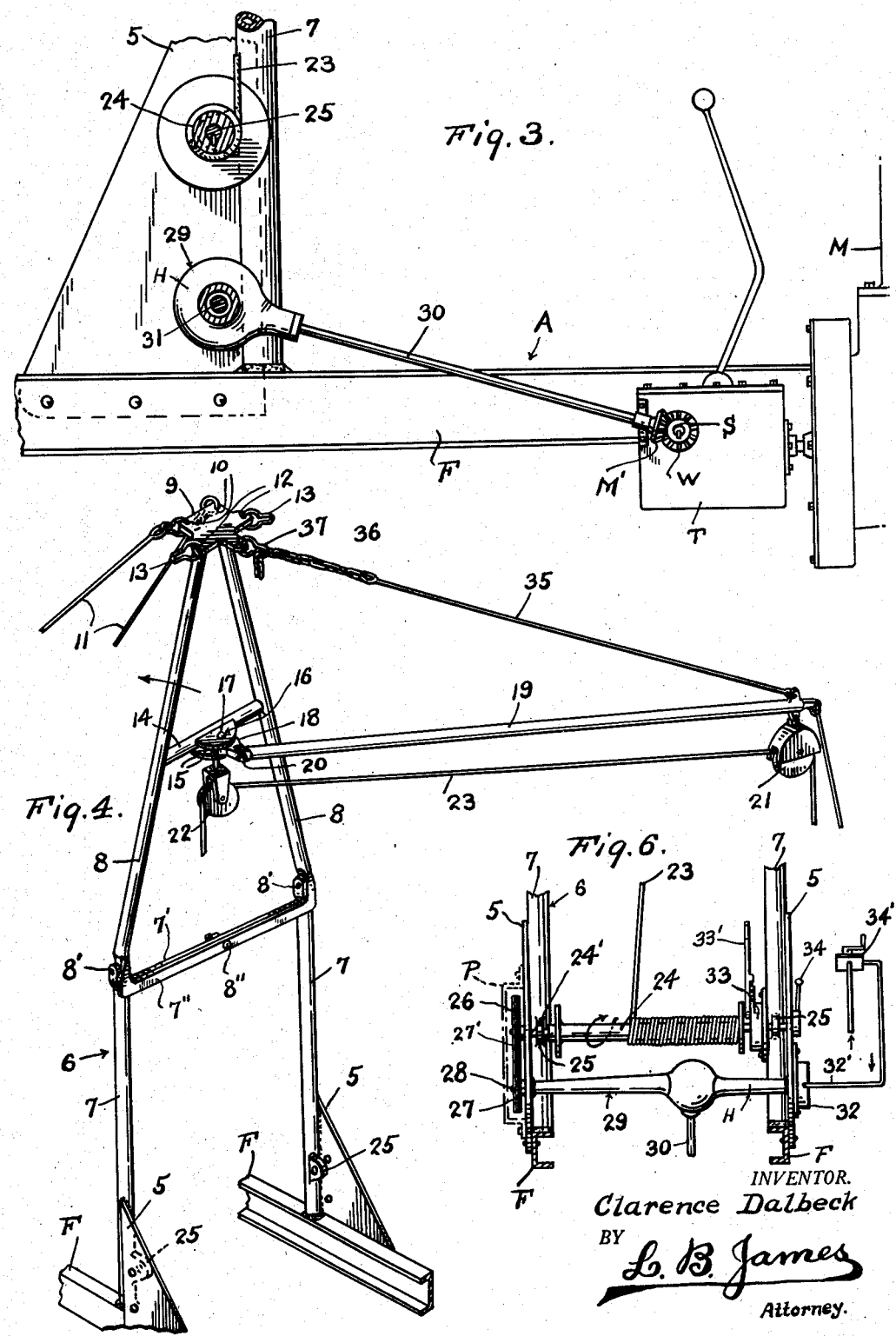

Patented Aug. 15, 1950

2,519,119

UNITED STATES PATENT OFFICE 2,519,119

PORTABLE POWER HOIST

Clarence Dalbeck, Wakefield, Mich.

Application February 18, 1949, Serial No. 77,207

1 Claim. (Cl. 212—65)

This invention relates to material handling and more particularly a portable power hoist.

One of the objects of this invention resides in the provision of a hoist adapted to be mounted on a truck or other land traversing vehicle so as to be disposed adjacent material to be loaded, unloaded or otherwise moved.

Another object of this invention resides in the provision of a hoist adapted to be mounted on a motor vehicle and operated by the power plant thereof.

A further object of this invention resides in the provision of a hoist adapted to be mounted on a motor or other type of land traversing vehicle and operated by an adjacent power plant preferably carried by the vehicle.

A still further object of this invention resides in the particular assemblage of power transmitting means connecting the power plant of the vehicle to the boom operating windlass.

Aside from the aforesaid objects this invention resides in the particular construction of the mast and assemblage thereon of the hoisting boom.

Among the many objects of this invention is the provision of means whereby ease in both loading and pulling out slack in the hoisting cable for the succeeding load is permitted.

In addition to the foregoing objects this invention resides in the provision of means whereby the material being loaded can be held at any degree above the ground or place from which it is being moved.

With these and other objects in view, this invention resides in certain novel features of construction and arrangement of elements to be hereinafter more particularly set forth in the specification, illustrated in the accompanying drawings and pointed out in the appended claims and, although this disclosure depicts my present conception of the invention, the right is reserved to resort to such changes in construction thereof as come within the spirit of the invention.

In the accompanying drawings forming a part of this application:

Fig. 1 is a side view of a truck showing the hoist mounted thereon.

Fig. 2 is a plan view thereof.

Fig. 3 is a detailed longitudinal sectional view taken approximately on line 3—3 of Fig. 2 showing the power take-off from the truck motor.

Fig. 4 is a detail perspective view of the mast and hoisting boom mounted thereon.

Fig. 5 is a perspective view of a telescopic boom.

Fig. 6 is an enlarged cross sectional view taken approximately on line 6—6 of Fig. 2.

Fig. 7 is a diagrammatic view of the windlass driving means.

In the present illustration of this invention, the letter A designates a conventional truck which, among other well-known elements, consists of a frame F and motor M provided with a take-off shaft S having a suitable power transmitting element W keyed thereto.

Secured to the frame F as by triangle plates 5 is a mast 6 consisting of spaced parallel stationary lower members 7 merging at their upper ends into diverging members 8 hinged thereto at 8' and having their upper ends connected by a substantially rectangular plate 9. Said plate is provided with holes 10 adjacent its front corners to receive and secure the upper ends of cables 11 or other suitable braces secured to and extending to the front ends of the frame F, thereby forming means to relieve strain on the plates 5 and obviate the tendency of the mast to bend forwardly under the weight of heavy loads. The plate 9 is also provided with holes 12 adjacent its rear corners to loosely accommodate suitably shaped wings 13 or the like for connection of laterally extending bracing cables (not shown) thereto which are adapted to have their free ends secured to stationary pegs or the like (not shown) on opposite sides of the truck to prevent it from turning over under certain loading conditions.

Secured as by welding or the like between the converging hinge members of the mast is a cross beam 14 provided with rearwardly extending ears 15 having vertically aligned apertures 16 therein to receive a king pin 17, bolt or the like which extends through a block 18 pivotally disposed between said ears and pivotally supporting a hoisting boom 19 at its outer end by a horizontally disposed bolt 20 or the like extending therethrough thus providing the boom with universal movement relative to the mast.

Secured to the outer portion of the boom is a sheave 21 while secured to the lower portion of said ears 15 is a second sheave 22 over which is trained a hoisting cable 23 having its inner portion wound on a windlass 24 whose shaft 24' is journalled in bearings 25 secured to the lower portions of the members 7 and its outer end provided with a material engaging chain 25' or other suitable element whereby material can be fastened for lifting and moving. Said shaft 24' has its ends extending through holes in the triangular plates 5 and carries a large sprocket gear 26 keyed thereto and connected to a small sprocket gear 27 keyed to one of the laterally extending shafts 28 of a differential mechanism 29 by a chain 27'. Said differential mechanism is supported by the triangular plates 5 beneath the windlass while said sprocket gears and chain are protected by a suitable shield P secured to the outer surface of the adjacent triangular plate 5. The differential mechanism has its power shaft 30 connected to the aforesaid take-off shaft of the vehicle motor by means M' constructed to cooperate with the element W thereon while the companion lateral shaft 31 of said differential mechanism is provided with a hydraulic brake 32 controlled by a valve 34' which in conjunction with the controlled lever 33' of the emergency brake 33 on the windlass and clutch 34 control operation of the power transmitting means from the vehicle motor to the hoisting cable. The aforesaid hydraulic brake, when applied to the shaft 31, permits free rotation of the opposite or companion shaft to operate the windlass 24, while the emergency brake enables the attendant to hold the load at any position above its support whereas the clutch automatically prevents retroaction of the windlass while lifting a load and also permits it to quickly gravitate when released.

Secured to the outer portion of the boom is a cable 35 provided with a chain 36 at its inner end adapted to slidably extend through a ring 37 on the plate and lock the boom 19 at elected angles to the mast.

In order to retain rigidity of the housing H of the differential mechanism, the outer ends thereof are secured to the plates 5.

The upper members 8 of the mast are hingedly connected to the lower members 7 thereof and secured in upright operative position by extending a bolt 8" through aligned holes in opposed cross bars 7' and 7" secured to adjacent ends of said members and, in order to reduce the height of the mast so it will pass under overhead obstructions such as trees, bridges and the like while the vehicle is travelling along highways, the bolt 8" is removed from said cross bars and the upper members swung on the cab of the vehicle and secured thereon by any well known fastening means.

In Fig. 5 of the drawings, a modified form of boom is shown, the same consisting of telescopic members C and D locked together in its adjusted positions by a bolt E or other suitable elements.

Rotation of said drive shaft of the differential mechanism is controlled by the usual shift lever of the conventional transmission T or a suitable clutch (not shown).

Having thus described my invention, what I claim and desire to protect by Letters Patent is:

The combination with a motor operated vehicle including a power take-off, a mast including stationary lower members rigidly secured to the frame of the motor vehicle, converging upper members hinged to the upper ends of said stationary members, a stationary cross bar secured to said lower members of the mast, a cross bar secured to the upper members of the mast below their hinges, a fastening element securing said upper cross bars together to retain said upper members in operative position, substantially triangular plates securing said lower members of the mast to the frame of the vehicle, a substantially rectangular plate securing the upper ends of the upper members adjacent one another and having a series of holes in its corners, a cross beam secured between the converging upper members of the mast, rearwardly extending ears secured to the cross beam and having vertically aligned holes therein, forwardly extending cables connecting the rectangular plate to the front portions of the vehicle frame, a block disposed between the ears of the cross beam, a vertically disposed pivotal pin securing the block between the ears, a boom pivoted on a horizontal axis to the outer end of the block, a sheave disposed on the outer end of the boom, a sheave secured to said ears, a brace cable including a chain connected to the outer end of the boom and adjustably connected to the rectangular plate, means on said rectangular plate adjustably retaining the chain therein, a windlass including an emergency brake journalled on the lower portion of said lower members of the mast, a hoisting cable wound around the windlass at its inner end, a material fastening chain on the outer end of the aforesaid cable, a differential mechanism rigidly secured to the triangular plates and connected to said take-off of the motor, a brake on one drive shaft of the differential mechanism, a sprocket gear keyed to one end of the shaft of the windlass, a sprocket gear keyed to one of the drive shafts of the differential mechanism, a chain connecting said sprocket gears, and a clutch on the shaft of the windlass.

CLARENCE DALBECK

No references cited.